(12) United States Patent
Altmann et al.

(10) Patent No.: US 6,439,621 B1
(45) Date of Patent: Aug. 27, 2002

(54) TUBING COUPLING AND A METHOD FOR PRODUCING THE SAME

(75) Inventors: Klaus Altmann, Boennigheim; Rudolf Leipelt, Marbach, both of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/529,311

(22) PCT Filed: Oct. 10, 1998

(86) PCT No.: PCT/EP98/06433

§ 371 (c)(1),
(2), (4) Date: Apr. 12, 2000

(87) PCT Pub. No.: WO99/19658

PCT Pub. Date: Apr. 22, 1999

(30) Foreign Application Priority Data

Oct. 13, 1997 (DE) ................................. 197 45 192

(51) Int. Cl.⁷ ................................................. F16L 25/00
(52) U.S. Cl. ............. 285/381.4; 285/905; 29/DIG. 25; 29/DIG. 35
(58) Field of Search ............................. 285/239, 381.1, 285/381.4, 905; 29/447, DIG. 13, DIG. 23, DIG. 25, DIG. 35; 264/DIG. 61, DIG. 76

(56) References Cited

U.S. PATENT DOCUMENTS

| | | | | |
|---|---|---|---|---|
| 3,594,020 A | * | 7/1971 | Ehlert | ........................ 285/239 |
| 3,972,548 A | * | 8/1976 | Roseen | ..................... 285/381.4 |
| 4,438,956 A | * | 3/1984 | Jones et al. | ............. 285/905 X |
| 5,700,528 A | * | 12/1997 | Fitch | ................... 285/381.4 X |
| 6,161,514 A | * | 12/2000 | Ernst et al. | |

FOREIGN PATENT DOCUMENTS

| | | |
|---|---|---|
| DE | 28 24 205 | 12/1979 |
| EP | 0 253 712 | 1/1988 |
| GB | 903 757 | 8/1962 |
| GB | 2 023 726 | 1/1980 |
| WO | WO 94/23237 | 10/1994 |

OTHER PUBLICATIONS

CRC Materials Science and Engineering Handbook, 2nd ed. Boca Raton, CRC Press, 1994, p. 335. TA403.4.C73.*

* cited by examiner

*Primary Examiner*—Greg Binda
(74) *Attorney, Agent, or Firm*—Crowell & Moring LLP

(57) ABSTRACT

A tubing coupling and a method for connecting tubing sections in which one tubing section is placed upon another tubing section in an overlapping manner. The first tubing section (1) is enlarged in the cold state in the area (2) where it overlaps, and the enlarged area is then placed over the second tubing section (3). Subsequent heating of the enlarged area (2) results in shrinkage of the first tubing section (1) which produces a firm seating of the first tubing section (1), for example a plastic suction tube as an air inlet tube, on the second tubing section (3), for example a flange for attachment to the cylinder head of an internal combustion engine.

5 Claims, 1 Drawing Sheet

TUBING COUPLING AND A METHOD FOR PRODUCING THE SAME

BACKGROUND OF THE INVENTION

The invention relates to a tube coupling which is produced by shrink fitting a first tube part onto a second tube part.

It is known from GB Patent 903,757 that a synthetic resin tube made of thermoplastic material is fastened to a fixed hose connection by first being expanded and then shrunk onto the hose connection. The hose connection has annular ridges in the form of locking ribs on its circumference.

It is also known from German OS 28 24 205 to fasten an air intake tube to the cylinder head of an internal combustion engine in which a prefabricated annular bead is provided at the end of the air intake tube. This bead is gripped by means of a flange ring with an internally positioned elastomer ring and then the flange ring is fastened to a flange surface of the cylinder head. In this known kind of attachment, a plurality of components must thus be held simultaneously, and by means of relatively complicated clamping and threading procedures they must be attached at places on the cylinder head which as a rule are not easily accessible.

SUMMARY OF THE INVENTION

It is the object of the invention to provide a tube coupling and a method for its production by simple steps and appropriate materials which can be handled with few and simple means and which assures a lastingly secure connection even under special circumstances of use.

ADVANTAGES OF THE INVENTION

The generic tube coupling with a first tube part of thermoplastic synthetic resin material and a tube connector as a second tube part onto which the tube can be shrunk is further developed in accordance with the invention in that the first tube part is a blow-molded synthetic resin part, and the second tube part is an injection molded synthetic resin part, wherein both tube parts have approximately equal coefficients of thermal expansion throughout a wide temperature range with respect to longitudinal and transverse expansion.

In a preferred application, the first tube part is advantageously a component of an air intake tube in the air intake tract of an internal combustion engine and the other tube part is a flange part on the cylinder head of the internal combustion engine for fastening the first tube part. Both tube parts must here withstand starting or operating temperatures in a range from −40° C. to +150° C. and should nevertheless lastingly assure a tight fit without additional fastening materials.

In order in this case to achieve a lessening or equalization of the thermal expansion coefficients in an advantageous manner, the first tube part is, according to the invention, a blow-molded synthetic resin part made of polyamide with a longitudinal thermal expansion coefficient of approximately $0.2 \cdot 10^{-4}/K$ and a transverse thermal expansion coefficient of about $1.0 \cdot 10^{-4}/K$, and the second tube part is an injection-molded synthetic resin part made of polyamide with a longitudinal thermal expansion coefficient of approximately $0.35 \cdot 10^{-4}/K$ and a transverse thermal expansion coefficient of approximately $1.2 \cdot 10^{-4}/K$.

With the material properties stated above, the stretch elongation in the stated temperature range can advantageously be limited to about 12% and the expansion of the tube parts to about 8% (corresponding to about 3 mm for a nominal width of 40 mm). The maximum difference between the overlapping tube parts here amounts to only about 0.1 mm in the stated temperature range, which assures a durable, tight fit between the joined tube parts.

Suitable materials for the tube parts include, advantageously, for the first tube part PA66Gf35 and for the second tube part PA6Gf10 or PA6Gf15. In a manner known in itself, annular locking ribs, which act opposite to the direction of the first tube part, can be provided on the second tube part in the seating area where the first tube part is shrunk onto it.

In a method for joining the tube parts, the first tube part can be expanded in the cold state in the area where it will overlap the second tube part and the first tube part can be slipped with its expanded portion over the second tube part. By heating this area a shrinkage and subsequent tight fitting of the first tube part onto the second tube part is produced. According to the invention, the inside diameter prior to expansion is smaller than the outside diameter of the second tube part, and after expansion it is slightly larger than the outside diameter of the second tube part.

In a simple production step the first tube part—here preferably an air intake tube to be attached to the cylinder head—is expanded in the cold state in the area where it will overlap the second tube part, here preferably the flanged piece for fastening to the cylinder head. In this area of the first tube a mechanical tension is thus frozen into the circumference, whereby the inside diameter prior to expansion was smaller than the outside diameter of the other tube part and after expansion is slightly larger than the outside diameter of the other tube part.

In the second production step the expanded region of first tube part is slipped in an advantageous manner onto the other tube part and by heating this region it is made to shrink and fit tightly on the second tube part. Thus, the heating releases the circumferential tension frozen in during the cold expansion again and results in a tight constriction around the other tube part.

With this method according to the invention it is thus possible in a simple manner for the second tube part, for example, the separate flange part, to be attached to the first tube part prior to the final installation of the first tube, and then both parts together can be fastened by simple means to the cylinder head of an internal combustion engine.

These and additional features of preferred embodiments of the invention will be found not only in the claims but also in the description and the drawings, the individual features being applicable individually or jointly in the form of subcombinations in embodiments of the invention and in other fields and may represent advantageous as well as independently patentable embodiments, for which protection is hereby claimed.

BRIEF DESCRIPTION OF THE DRAWINGS

A working embodiment of the tube connection according to the invention is explained with reference to the drawing, wherein:

FIG. 2 shows a tube connection with a tube part shrunk on.

DETAILED DESCRIPTION OF PREFERRED EMBODIMENTS

Figure 1:
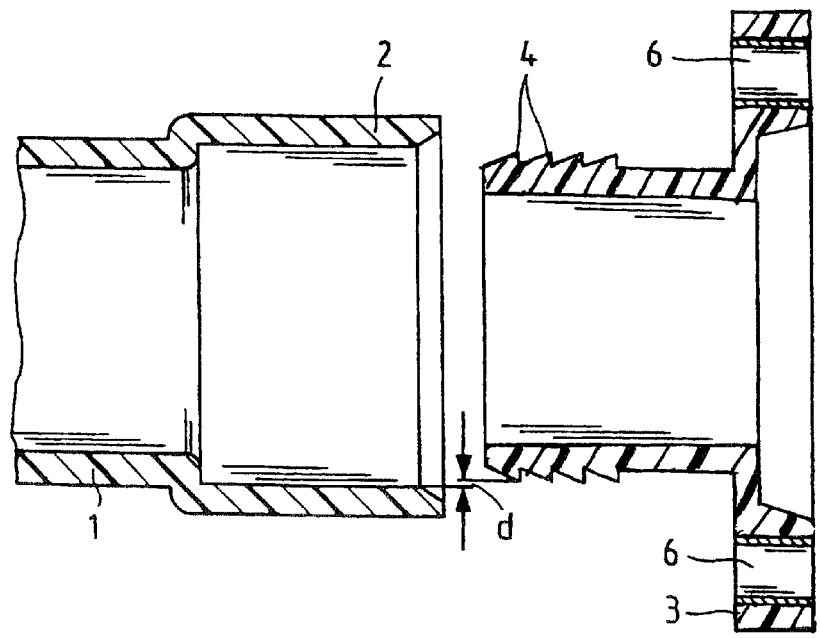
FIG. 1 shows a tube connection with an expanded tube part.

FIG. 1 is shown a first tube part 1 which is the end of an air intake tube which is a blow-molded synthetic resin part for the air intake tract of an internal combustion engine which is not shown here. The tube part 1 is expanded in an area 2 in the cold state so that this expansion is frozen in this state. A second tube part 3 is configured as a flange part for connecting the air intake tube to the cylinder head of the internal combustion engine.

The second tube part 3 has circumferential locking ribs 4 on its periphery at the point of connection to the first tube part. The inside diameter of the first tube part 1 in the area 2 of the expansion can be greater by an amount d than the outside diameter of the second tube part 3 including the locking ribs 4, so that assembly of the tube parts 1 and 3 is facilitated. Suitable materials for the tube parts include, as mentioned in the general description, PA66Gf35 for example for the first tube part, and for the second tube part, PA6Gf10 or PA6Gf15, due to their appropriate coefficients of thermal expansion.

Figure 2:
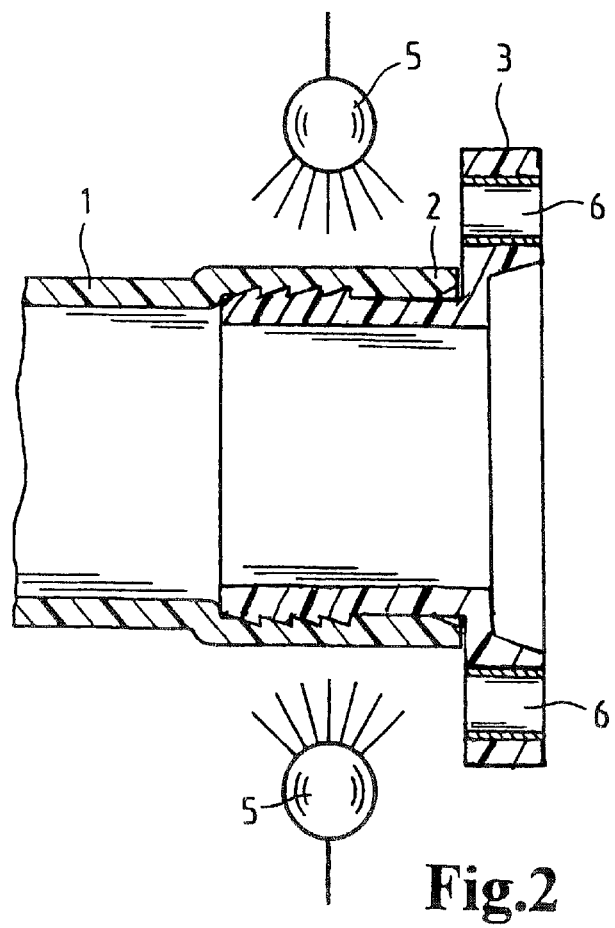

FIG. 2 shows how the area 2 of the first tube part 1 is heated with a heating apparatus 5 and is shrunk onto the second tube part 3 by the release of the frozen in mechanical tension. The first tube part 1 now fits tightly, also reinforced by the locking ribs 4, onto the second tube part 3, and can be attached with screws, together with the air intake tube (tube part 1), via mounting holes 6 onto the above-mentioned cylinder head of an internal combustion engine.

Reference Numeral List

=first tube part (intake tube)
=expanded region
=second tube part (flange portion)
=gripping ribs
=heating device
=attachment holes

What is claimed is:

1. A tube coupling comprising a first tube part made of thermoplastic synthetic resin material and a second tube part in the form of a connection onto which the first tube part can be shrink fitted, wherein said first tube part is a blow-molded synthetic resin part and said second tube part is an injection-molded synthetic resin part, said first and second tube parts both having approximately equal thermal expansion coefficients with regard to longitudinal and transverse expansion, and wherein said first tube part is a blow-molded polyamide part with a longitudinal thermal expansion coefficient of about $0.2 \cdot 10^{-4}$/K and a transverse thermal expansion coefficient of about $1.0 \cdot 10^{-4}$/K, and said second tube part is an injection-molded polyamide part with a longitudinal thermal expansion coefficient of about $0.35 \cdot 10^{-4}$/K and a transverse thermal expansion coefficient of about $1.2 \cdot 10^{-4}$/K.

2. A tube coupling according to claim 1, wherein the first tube part is made of PA66Gf35, and the second tube part is made of PA6Gf10 or PA6Gf15.

3. A tube coupling according to claim 1, wherein said second tube part further comprises at least one circumferential locking rib formed peripherally thereon in the area in which the first tube part is seated by shrinking it onto the second tube part.

4. A tube coupling according to claim 1, wherein said first tube part is a component of an air intake tube for an air intake tract of an internal combustion engine, and said second tube part is a flange which can be fastened via screws onto a cylinder head of the internal combustion engine.

5. A method for joining first and second tubular parts, comprising the steps of:

expanding an end area of the first tube part in a cold state;

slipping the expanded end area of said first tube part over a receiving end area of the second tube part so that the expanded area of the first tube part and the receiving area of the second tube area overlap each other; and heating the expanded area of the first tube part to shrink the first tube part onto the receiving area of the second tube part and form a tight connection between the parts;

wherein the first tube part prior to expansion has an inside diameter which is smaller than the outside diameter of the second tube part, and which after the expansion is larger than the outside diameter of the second tube part;

and wherein the first tube part is a blow-molded synthetic resin part of polyamide with a longitudinal thermal expansion coefficient of about $0.2 \cdot 10^{-4}$/K and a transverse thermal expansion coefficient of about $1.0 \cdot 10^{-4}$/K, and the second tube part is an injection-molded synthetic resin part of polyamide with a longitudinal thermal expansion coefficient of about $0.35 \cdot 10^{-4}$/K and a transverse thermal expansion coefficient of about $1.2 \cdot 10^{-4}$/K.

* * * * *